United States Patent
Peel et al.

(10) Patent No.: US 6,904,505 B1
(45) Date of Patent: Jun. 7, 2005

(54) METHOD FOR DETERMINING VALID BYTES FOR MULTIPLE-BYTE BURST MEMORIES

(75) Inventors: Eric Peel, Mission Viejo, CA (US); Bradley Roach, Newport Beach, CA (US); Qing Xue, Irvine, CA (US)

(73) Assignee: Emulex Design & Manufacturing Corporation, Costa Mesa, CA (US)

(*) Notice: Subject to any disclaimer, the term of this patent is extended or adjusted under 35 U.S.C. 154(b) by 656 days.

(21) Appl. No.: 09/687,526

(22) Filed: Oct. 12, 2000

(51) Int. Cl.[7] .............................................. G06F 12/00
(52) U.S. Cl. .................... 711/168; 711/156; 710/34; 710/35
(58) Field of Search .......................... 711/154, 156.1, 711/67–169; 710/34–35

(56) References Cited

U.S. PATENT DOCUMENTS

| | | |
|---|---|---|
| 4,365,295 A | 12/1982 | Katzman et al. |
| 5,452,432 A | 9/1995 | Macachor |
| 5,604,884 A | 2/1997 | Thome et al. |
| 5,608,869 A | 3/1997 | Hamstra et al. |
| 5,875,466 A | 2/1999 | Wakerly |
| 6,041,369 A | 3/2000 | Watkins |
| 6,088,753 A | 7/2000 | Sheafor et al. |

*Primary Examiner*—Matthew D. Anderson
(74) *Attorney, Agent, or Firm*—Morrison & Foerster LLP

(57) ABSTRACT

A memory controller for a multi-byte burst memory device may control access to memory based on parameters set up by a client. These parameters may include a byte address and a byte count that indicates the number of bytes the client is requesting from memory. These values, and an integer representing the number of bytes in a burst-accessed word, may be operated on to produce a word that may be used to identify valid bytes in the burst-accessed word.

19 Claims, 3 Drawing Sheets

METHOD FOR DETERMINING VALID BYTES FOR MULTIPLE-BYTE BURST MEMORIES

TECHNICAL FIELD

This invention relates to data processors, and more particularly to data processors that support burst memory accesses.

BACKGROUND

In computer systems, a central processing unit (CPU) may access memory by providing an address that indicates a unique location of a group of memory cells that collectively store a data element. The CPU may initiate a bus cycle by providing the address to an address bus, and one or more control signals to signal that the address is valid and the bus cycle has begun. A read/write control signal then indicates whether the access is to be a read access or a write access. Subsequently, the data element may either be read from a data bus if the bus cycle is a read cycle, or provided to the data bus if the bus cycle is a write cycle.

A number of operations may be taken when performing an initial access to memory. These operations may make the initial access relatively slow. As described above, certain signals may be set to begin the process. Next, the address may be sent to the memory. After these steps, the data itself may be transferred. Because of this operational overhead, or latency, the initial access to memory may take a relatively long time, e.g., four to seven clock cycles in many devices.

To reduce the latency of the memory, some memory devices read a block four 64-bit words (256 bits or 32 bytes) from memory consecutively for each access. An advantage of this "burst access mode," or "bursting," is avoiding repetition of the overhead of the initial access for the subsequent three accesses. The subsequent accesses may be shortened to one to three clock cycles instead of four to seven clock cycles.

A memory device that supports bursting may not be byte-addressable. Instead of accessing a memory location at a specific byte address, the memory device may retrieve a multi-byte block of data elements. Some of the data elements in the block of data may not be valid for the request. Accordingly, it may be advantageous to provide a method for determining the valid data elements in a burst-accessed word.

SUMMARY

According to an embodiment, a memory controller for a multi-byte burst memory device may control access to memory based on parameters set up by a client. These parameters may include a byte address and a byte count that indicates the number of bytes the client is requesting from memory. These values, and an integer, m, representing the number of bytes in a burst-accessed word, may be operated on to produce a word that may be used to identify valid bytes in the burst-accessed word.

According to an embodiment, the memory controller may generate an m-bit, bytes-enable word that includes valid bits that correspond to valid bytes in the burst-accessed word. A portion of the byte address may be truncated to produce an n-bit word, and an enable value calculated from the n-bit word, the byte count, and the m value. A pre-shifted bytes enable word may be generated from the enable value and the m value. The bytes enable word may be generated by shifting the bits in the pre-shifted bytes enable word by a value of the n-bit word.

The details of one or more embodiments are set forth in the accompanying drawings and the description below. Other features, objects, and advantages of the embodiment(s) will be apparent from the description and drawings, and from the claims.

DETAILED DESCRIPTION

Figure 1:
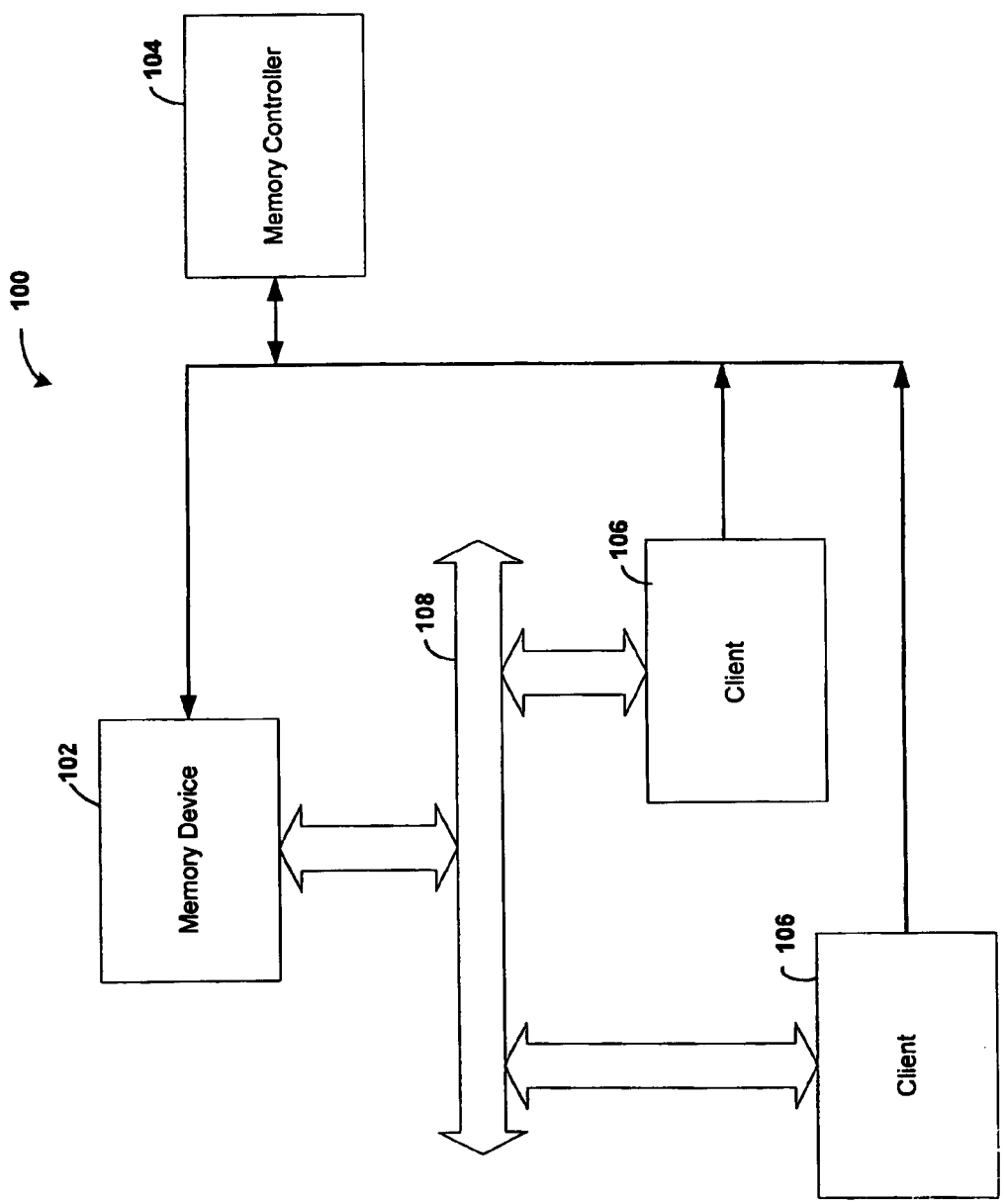
FIG. 1 is a block diagram of a system including a multiple-byte burst memory device according to an embodiment.

FIG. 1 illustrates a system 100 including a multi-byte burst memory device 102. A memory controller 104 may control read operations from and write operations to the memory device 102 by clients 106 on a read/write bus 108.

Each client 106 may set up parameters at the beginning of an access. Based on these parameters, the memory controller 104 may decide when to handle each client's request. These parameters may include a byte count and a starting byte address. The byte count refers to the number of bytes in the memory device 102 the client 106 wants to access. The starting byte address refers to the byte address in memory where the access will begin. The memory device 102 may not be byte-addressable, and as such, accesses to the memory device 102 may be performed in multiple-byte bursts. The bytes may be accessed in a linearly increasing order, without skipping intervening bytes.

The starting byte address may initially be truncated by a number of bits necessary to match of the level of "granularity" of the memory device 102, that is, the precision of a burst access to the memory device 102. The truncated starting byte address may form a "word address" that may be used to gain access to the multiple-byte word containing the first byte in the data element requested by the client 106. The truncated bits may be saved temporarily and used to determine which bytes from the first access are valid. The first multi-byte burst word accessed from the memory device 102 may contain just one valid byte, or more, up to to the entire word. The word address may be incremented by one after each access.

The byte count may be arithmetically combined with the byte address to calculate an "enable value." The enable value may represent the number of valid bytes that will be accessed. The enable value may be used to decrement the byte counter after each access, calculate the last byte address that was accessed, calculate the next byte address to be accessed in order to satisfy the client request, and form a word that may be expanded and used for byte enables and parity checking enables for either written or read bytes.

Figure 2A:
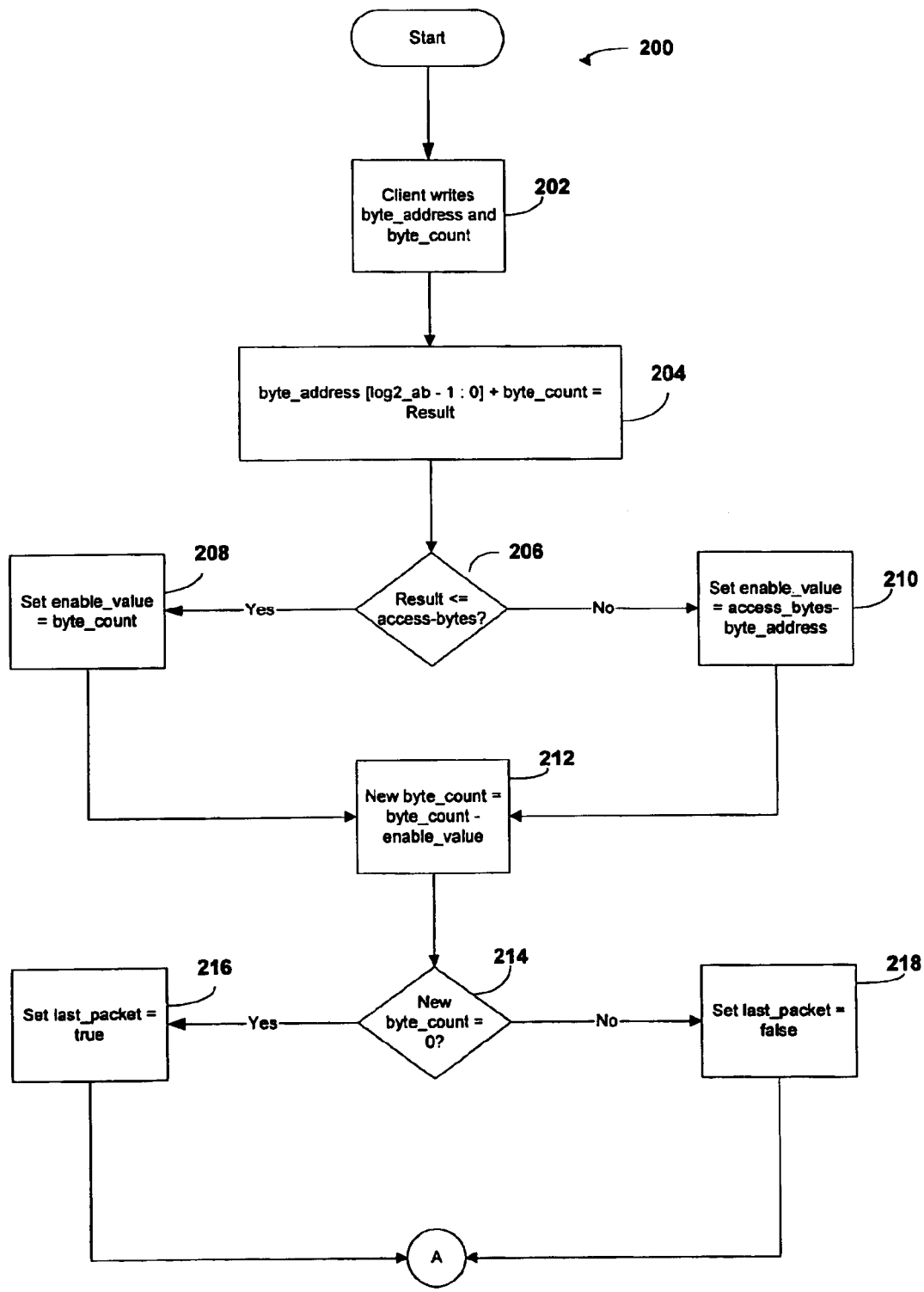
FIGS. 2A and 2B illustrate a flowchart describing an operation for determining valid bytes in a multiple-byte burst-accessed word according to an embodiment.
Figure 2B:
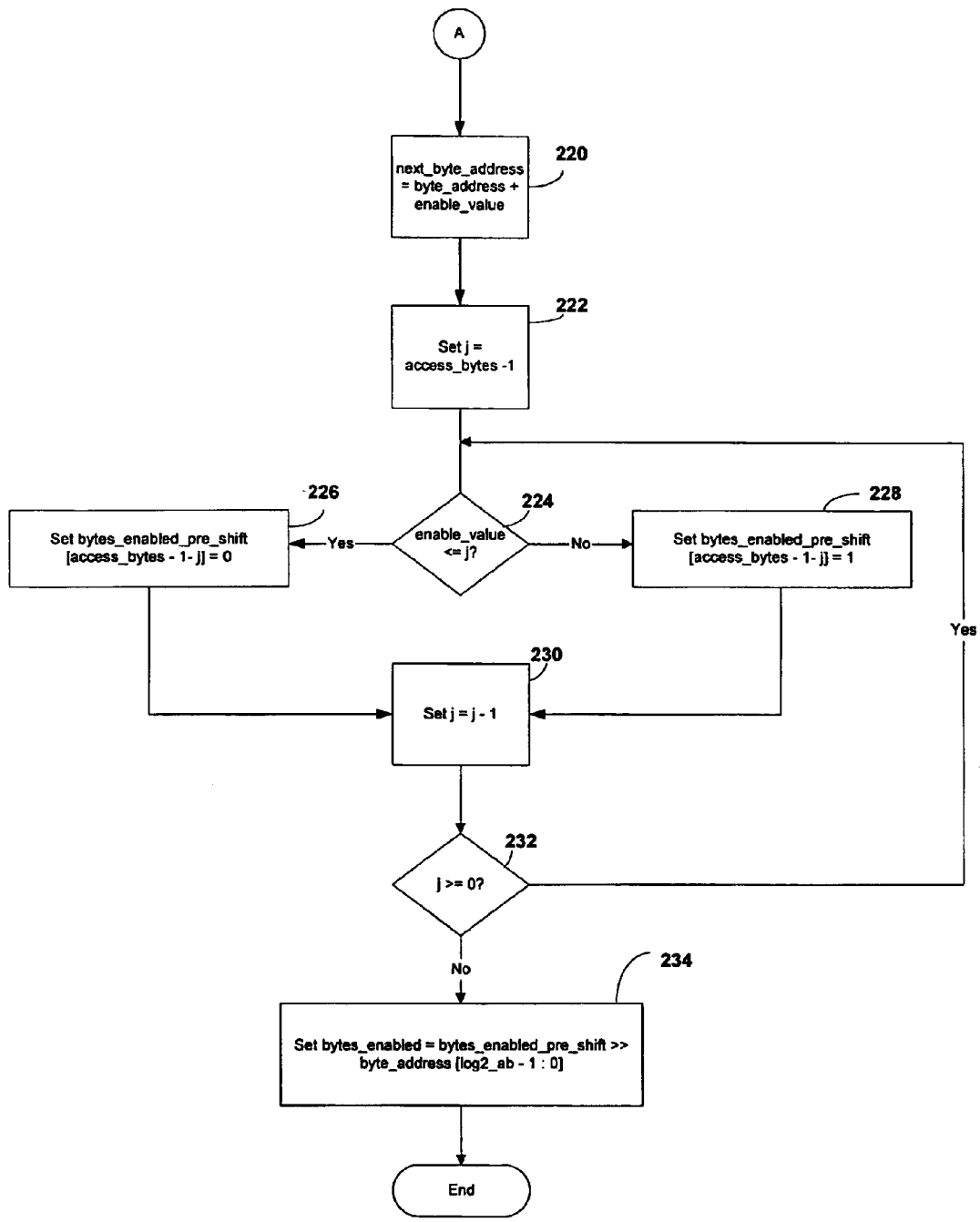

FIGS. 2A and 2B describe an operation 200 for determining valid bytes in a multi-byte burst accessed word. The accessed word may have m bytes, where $m=2^n$ and n is some integer. In the description of the operation 200, the integer m is also referred to the "access bytes value".

The following description is one embodiment of implementing the operation 200. In other embodiments, states may be skipped or performed in a different order.

The client 106 may write the byte address and byte count parameters to the memory controller 104 in state 202. The byte count may be added to a truncated portion of the byte address to produce a result in state 204. The truncated portion of the byte address may include bits 0 to x of the byte address, where x equals the base two logarithm of the access bytes value minus one. If the result is determined to be less than or equal to the access byte value in state 206, the enable value may be set to the byte count in state 208. Otherwise, the enable value may be set to the value of the access bytes value minus the byte address in state 210. A new byte count may be set to the value of the byte count minus the enable value in state 212. If this new byte count equals zero, a last packet value may be set to a TRUE value in state 216. If the new byte count has a non-zero value, the last packet value may be set to a FALSE value in state 218. The last packet value may be used to determine whether the client has accessed all requested bytes from the memory device 102, or whether another burst access is necessary to satisfy the request.

Progressing to FIG. 2B, an address for the next access necessary to satisfy the client request, a "next byte address," may be determined by adding the byte address to the enable value in state 220. A value j may be set to the access bytes value minus one in state 222. The j value may be an integer used as a counter for a loop operation in which an m-bit pre-shifted bytes enable word is constructed. The pre-shifted bytes enabled word may be a precursor to a bytes enabled word, described below, used to identify the valid bytes in the burst-accessed word.

If the enable value is determined to be less than or equal to j in state 224, a bit in the pre-shifted bytes enabled word may be set to zero in state 226. That bit is in a position y, where y equals the access bytes value minus j minus one. Otherwise, bit y is set to one in state 228. The j value may be decremented by one in state 230.

If it is determined that j is less than or equal to zero in state 232, the operation 200 may return to state 224 and continue to construct the m-bit pre-shifted bytes enabled word.

If it is determined that j is greater than zero in state 232, the operation 200 may fall through the loop and determine the value of an m-bit bytes enabled word. Each bit in the bytes enable word may correspond to a byte in the burst-accessed word. In state 234, the value of the bytes enabled word is set to the value of the pre-shifted bytes enabled word, but with the bits shifted by z bits, where z is the value of the truncated portion of the byte address word identified in state 204.

The operation 200 may also be understood with reference to the following example:

EXAMPLE 1

In this example, the byte address is 8, the byte count is 42, and the access bytes value is 32, i.e., the burst-accessed word is 32-bytes wide. The sum of the byte address and the byte count is calculated in state 204. Since $\log_2(32)$ is 5, the truncated portion of the byte address used in state 204 includes the five least significant bits of the byte address, i.e., $$\text{byte\_address}[5-1:0] =$$
$$\text{byte\_address}[4:0] = 01000_2$$
$$= 8_{10}.$$

The calculated result is therefore 50. Since this result is greater than the access bytes value, 32, the enable value is set to 24 (access bytes, 32, minus byte address, 8) in state 210.

The new byte count is then set to 17 (byte count, 41, minus enable value, 24) in state 214. Since this value is not zero, the last packet value is set to FALSE in state 218, indicating that this is not the last burst access, that is, the access that satisfies the client 106 request.

The next byte address is set to 32 (byte address, 8, plus enable value, 24) in state 220. The j value is set to 31 in state 222. Since j, 31, is greater than the enable value, 24, the branch to state 226 is taken. The first bit in the pre-shifted bytes enabled word is calculated in state 226 as follows:

$$\text{bytes\_enabled\_pre\_shift}[32-1-31] = \text{bytes\_enabled\_pre\_shift}[0] = 0$$

Thus, bit [0] in the m-bit pre-shifted bytes enable word is set to zero. The j value is decremented in state 230 and the loop continues in state 232. The branch to state 226 is taken for the values of j from [31] to [24], setting bits [0]–[7] in the pre-shifted bytes enabled word to zero. At j=[23], the enable value is greater than j, and the branch to state 228 is taken. The loop continues, setting bits [8]–[31] in the pre-shifted bytes enabled word to one. At this stage, the pre-shifted bytes enabled word has the value [11111111111111111111111100000000].

When the pre-shifted bytes enable word has been constructed, the j value is set to negative one in state 230 and the operation 200 falls through the loop to state 234. The bytes enabled word is set to the value of the pre-shifted bytes enabled word shifted by z bits, where z is the value of the truncated portion of the byte address. In this example, $$\text{byte\_address}[\log_2 ab - 1:0] =$$
$$\text{byte\_address}[4:0] =$$
$$01000_2 = 8_{10}.$$

Thus, the values are shifted eight bits, yielding:

Pre_shift_bytes_enabled = 11111111111111111111111100000000
bytes_enabled = 00000000111111111111111111111111.

In this example, bytes [0]–[23] in the burst-accessed word would be treated as valid bytes and bytes [24]–[31] would be treated as invalid bytes. Only the valid bytes in the burst-accessed word may be accessed by the client 106.

The operation 200 may be most useful for the first access and the last access by the client 106 for a particular set of access parameters, since the intervening accesses would contain all valid bytes. Also, using this operation 200, it may not be necessary to initialize the memory device 102 by writing each location with good data and parity, because the memory controller 104 may only check parity on the bytes the client 106 has requested.

The memory controller 104 may provide the client 106 with the next byte address. According to an embodiment, the client may store this address, begin an entirely new operation with new access parameters, and then later start another operation using the saved address information. The client 106 may then be able to resume an earlier read or write operation precisely where it left off.

A number of embodiments of the invention have been described. Nevertheless, it will be understood that various modifications may be made without departing from the spirit and scope of the invention. Accordingly, other embodiments are within the scope of the following claims.

What is claimed is:

1. A method for determining valid bytes in an m-byte word accessed from a burst memory, comprising:

receiving a plurality of access parameters;

generating an m-bit enable word from the access parameters and a value of m, said m-bit enable word including at least one valid bit corresponding to at least one valid byte in the m-byte word; and making a client request to memory;

wherein the access parameters from which the m-bit enable word is generated include a first address and a byte count value indicating a number of bytes in said client request to memory; and wherein generating the m-bit enable word comprises
truncating a portion of the first address to produce an n-bit word,
generating an enable value from the n-bit word, the byte count value, and the m value,
generating an m-bit pre-shifted enable word from the enable value and the m, and
shifting the bits in the m-bit pre-shifted enable word by a value of the n-bit word.

2. The method of claim 1, wherein the n value equals a base two logarithm of the m value minus one, and said n-bit word comprises a plurality of bits between and including a least significant bit and a bit in position n in the first address.

3. The method of claim 1, further comprising:
in response to the byte count value and the enable value, determining whether an access to memory satisfies a client request which generated the access.

4. The method of claim 1, further comprising:
generating a second address for a subsequent access to memory from the first address and the enable value.

5. The method of claim 1, wherein the value of m is thirty-two.

6. A memory controller comprising:

a data input to receive a plurality of access parameters from a client device and an access bytes value indicating a number of bytes in an m-byte burst word from a memory device; and an enable circuit to determine at least one valid byte in the m-byte burst word in response to the plurality of access parameters and the access bytes value;

wherein the plurality of access parameters in response to which the at least one valid byte in the m-byte burst word is determined include a first address and a byte count value indicating a number of bytes in a client request to memory; and wherein the enable circuit determines the at least one byte in the m-byte burst word by
truncating a portion of the first address to produce an n-bit word,
generating an enable value from the n-bit word, the byte count value, and a value of m,
generating an m-bit pre-shifted enable word from the enable value and the m value, and
shifting the bits in the m-bit pre-shifted enable word by a value of the n-bit word.

7. The memory controller of claim 6, further comprising:
an enable word generator to generate an enable word including at least one valid bit corresponding to the at least one valid byte in the burst word.

8. The memory controller of claim 7, wherein the burst word comprises an m-byte word and the enable word comprises an m-bit word.

9. A system, comprising:

a memory device comprising a plurality of memory elements, each memory element having an associated address;

a client device;

a bus to pass data between the memory device and the client device; and a memory controller to control an access by the client device to an m-byte burst word in the memory device over the bus, said memory controller operating to receive a plurality of access parameters from the client device and determine at least one valid byte in the m-byte word in response to the plurality of access parameters and a value of m;

wherein the memory controller comprises an enable word generator to generate an enable word including at least one valid bit corresponding to the at least one valid byte in the burst word;

wherein the memory controller is operative to receive a client request to memory;

wherein the plurality of access parameters, from which the at least one valid byte is determined, include a first address and a byte count value indicating a number of bytes in said client request to memory; and wherein the enable word generator generates the enable word by
truncating a portion of the first address to produce, an n-bit word,
generating an enable value from the n-bit word, the byte count value, and a value of m,
generating an m-bit pre-shifted enable word from the enable value and the m value, and
shifting the bits in the m-bit pre-shifted enable word by a value of the n-bit word.

10. The system of claim 9, wherein the memory controller is operative to determine a second address for a subsequent access for the plurality of access parameters.

11. The system of claim 10, wherein the client is operative to store the second address.

12. The system of claim 9, wherein the memory device is a burst memory device.

13. The system of claim 9, wherein the memory controller is operative to determine whether the access is a last access required to satisfy a client request.

14. The system of claim 9, wherein the bus comprises a read bus and a write bus.

15. Apparatus, including instructions residing on a machine-readable medium, for determining valid bytes in an m-byte word accessed from a burst memory, said instructions causing the machine to:

receive a plurality of access parameters; and generate an m-bit enable word from the access parameters and the m value, said m-bit enable word including at least one valid bit corresponding to at least one valid byte in the m-byte word;

wherein the access parameters, from which the m-bit enable word is generated, include a first address and a byte count value indicating a number of bytes in a client request to memory; and wherein the instructions to generate the m-bit enable word comprise instructions causing the machine to
truncate a portion of the first address to produce an n-bit word, generate an enable value from the n-bit word, the byte count value, and the m value, generate an m-bit pre-shifted enable word from the enable value and the m value, and shift the bits in the m-bit pre-shifted enable word by a value of the n-bit word.

16. The apparatus of claim 15, wherein the n value equals a base two logarithm of the m value minus one, and said n-bit word comprises a plurality of bits between and including a least significant bit and a bit in position n in the first address.

17. The apparatus of claim 15, further comprising instructions that cause the machine to:

determine whether an access to memory satisfies a client request in response to the byte count value and the enable value.

18. The apparatus of claim 15, further comprising instructions that cause the machine to:

generate a second address for a subsequent access to memory from the first address and the enable value.

19. The apparatus of claim 15, wherein the value of m is thirty-two.

* * * * *